United States Patent [19]

Fletcher et al.

[11] 3,755,283

[45] Aug. 28, 1973

[54] NOVEL POLYMERS AND METHOD OF PREPARING SAME

[76] Inventors: James C. Fletcher, Administrator of the National Aeronautics and Space Administration with respect to an invention by; Stanley M. Hirshfield, New City, N.Y.

[22] Filed: May 19, 1971

[21] Appl. No.: 145,027

[52] U.S. Cl...... 260/93.5 S, 252/431 R, 252/431 N, 260/47 UP, 260/93.5 A, 260/94.2 R, 260/94.2 M, 260/94.7 R, 260/567.6 M
[51] Int. Cl........... C08f 1/74, C08f 1/76, C08f 3/16
[58] Field of Search................... 260/47 UA, 47 UP, 260/93.5 S, 94.2 M, 94.2 R, 94.6, 567.6 M; 252/431 N, 431 R

[56] References Cited
UNITED STATES PATENTS

| | | | |
|---|---|---|---|
| 3,326,881 | 6/1967 | Uraneck | 260/94.6 |
| 3,631,009 | 12/1971 | Meyer | 260/82.3 |

*Primary Examiner*—Joseph L. Schofer
*Assistant Examiner*—C. A. Henderson, Jr.
*Attorney*—John R. Manning, Monte F. Mott and Wilfred Grifka

[57] ABSTRACT

Polymers are prepared with terminal functional groups by reacting a compound selected from the group consisting of lithium p-lithiophenoxide and tetrabutylammonium p-lithiophenoxide as an initiator with material such as butadiene. The resulting functionally terminated new polymers are then capable of reacting with coupling agents to form star polymers.

6 Claims, No Drawings

NOVEL POLYMERS AND METHOD OF PREPARING SAME

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435.42 U.S.C. 2457).

BACKGROUND OF THE INVENTION

1. Field of the Invention:

This invention is in the field of polymers. More particularly, the invention relates to novel polymers containing functional groups and the utilization of such polymers to form additional novel polymeric materials. More particularly the invention relates to polymers containing a functional-group containing phenyl group at one end and a C-Li group at the other, and novel polymeric materials resulting therefrom.

2. Description of the Prior Art:

Functional group terminated butadiene polymers have proved to be extremely useful as binders in the preparation of general purpose castable aluminized propellant. These binder materials allow high solids loading of 85 to 90 percent, and provide propellants with low shock sensitivity and mechanical properties superior to those obtained with any other binder system. However, poor batch-to-batch reproducibility remains the major problem. This variability necessitates the adjustment of propellant formulation for each new batch of polymer if reproducible properties are to be obtained. The preparation of these polymers utilizes a process of unusual versatility known as anionic polymerization. However, it is the lack of control of this versatility that has lead to the widespread differences in batch-to-batch properties. In recent years, effort has been directed toward determining those structural features producing optimum physico-mechanical properties in propellants formulated from these functional group terminated butadiene materials. Thus, efforts have been directed at improving the properties of difunctional polymers and particularly difunctionally terminated polybutadiene, and to synthesize new classes of polymers from this material in order to provide, not only better binders, but provide for materials having reproducible properties.

In the anionic polymerization mentioned above, one can obtain the aforementioned typical difunctional polymer. An example of such a material is hydroxy-terminated polybutadiene. Another typical example is carboxy-terminated polybutadiene. In order to cross-link these materials it was required to utilize a trifunctional cross-linking agent. It is difficult, however, to react the materials efficiently because of crowding of the large pre-polymer materials around the small cross-linking molecules. Thus, it would be desirable to obtain a method of achieving cross-linking of functionally-terminated anionic polymers without requiring the typical trifunctional cross-linking agents.

Prior to the herein invention, the reactions of iodo or bromobenzenes and butyllithium had been reported by Gilman and Arntzen in an article entitled "Halogen-Metal Inter Conversions with Halides Containing Functional Groups" JACS 69, 1537 (1947). This article described the reaction of butyllithium with, for example, $HOC_6H_4I$ to form $LiOC_6H_4Li$. The resulting lithium-lithio phenoxide was reported to apparently react with the starting iodo or bromo compounds to form, in situ, $C_6H_5OLi$ plus $BrC_6H_4OLi$. The resulting organolithium compound was then carbonated to eventually produce a hydroxy benzoic acid as a derivative for structure proof. There was no indication or mention whatsoever of the use of the organolithium compound as an initiator for polymerization.

In an attempt to provide multifunctional monomers or polymers which are susceptible to cross-linking through difunctional curing agents, various attempts have been made to form graft polymers wherein functional groups are attached along the backbone of the monomer or polymer. This, however, involves a complex synthesis and has not found wide acceptability. As will be shown, the herein invention encompasses the preparation of star polymers having a general configuration

where A is a polymer chain and B is the junction point of the star. The advantages of this type of a polymer when functionally terminated will be further explained. Similar products, however, have been disclosed in the past. However, they differed in one major and important area. Namely, these prior star polymers were not functionally terminated and, thus, could not be used in cross-linking reactions in the manner required by the products of this invention.

SUMMARY OF THE INVENTION

The herein invention briefly comprises the utilization of lithium p-lithiophenoxide as an initiator in the preparation of functionally terminated star polymers together with the resulting novel star polymers formed thereby. The initiator, lithium p-lithiophenoxide is used with monomers which are subject to anionic polymerization. When reacted with such materials a resulting polymer is formed having an -OLi grouping on one end thereof and C-Li on the opposite end. When these functionally terminated polymers are then reacted with suitable coupling agents (such as $SiCl_4$) at the C-Li bond, a star polymer having an Si atom as the point of the star and terminated with -OLi groups is produced. The highly reactive functional -OLi or OH groups at the ends of the star polymer allow cross-linking thereof through the use of simple difunctional agents. It is believed that the invention will be further understood from the following detailed description and examples.

DESCRIPTION OF PREFERRED EMBODIMENTS

The herein invention encompasses various facets; however, all aspects of the invention are initially based upon the utilization of a particular material as an initiator for polymerization. Thus, as a starting point for the invention, the compound lithium p-lithiophenoxide is used as an initiator in an anionic polymerization of butadiene. Thus, though this material had been previously reported as indicated above, the material was not readily obtained in sufficient yield to provide a means for its practical utilization. The advantage of this particular material as an initiator is that it contains a functional group that will become attached to the monomer (and subsequently the polymer) upon polymerization.

Additionally, the initiator must be soluble in the polymerization media. The material contemplated herein has a benzene ring that provides such solubility. Further, and of course important for any initiator, is the fact that it be efficient. The compound lithium p-lithiophenoxide meets these requirements.

The first problem in accomplishing the invention relates to the preparation of the initiator. Generally, the initiator is prepared in accord with the following reaction:

1. $p\text{-}HOC_6H_4X + 2\,BuLi \rightarrow p\text{-}LiOC_6H_4Li + BuX + BuH$ where X=I or Br Bu=butyl group In effect, the reaction of butylithium and the halophenyl compound in accord with the overall reaction 1, above, is a two-step reaction. It is both a metal-halogen interconversion and an acid-base neutralization with the neutralization presumably preceding the metal-halogen exchange. Thus, the neutralization reaction is as follows:

2. $BuLi + HOC_6H_4X \rightarrow LiOC_6H_4X + BuH$

The metal-halogen exchange is indicated in the following reaction:

3. $LiOC_6H_4X + BuLi \rightarrow LiOC_6H_4Li + BuX$

In order to form the initiator, the halophenyl compound is dissolved in a suitable solvent, such as tetrahydrofuran. The butylithium is added as rapidly as possible to the solution without producing localized overconcentration of BuLi. The reaction can be carried out over a wide temperature range varying, for example, from $-78°$ up to 60°C. As will be explained, it is most desirable to carry out the reaction between zero and 30°C. In studying the Reaction 1 above to obtain the product initiator, it was found that it was difficult to obtain the desired high yields. For example, high yields were obtained at 0°C in fifteen minutes of reaction. However, the yield of the initiator, lithium p-lithiophenoxide diminished with time. At 15 minutes it was about 60%, at 30 minutes it was 50%, after two hours the yield was down to 29%. As the yield of the desired initiator decreased, there was an accompanying increase in the quantity of n-butylphenol isolated. It is believed that the BuX formed in Reaction 1 in turn reacts with the product in accordance with Reaction 4 below.

4. $LiOC_6H_4Li + BuI \rightarrow LiOC_6H_4Bu + LiI$

In view of Reaction 4 above, it is apparent that long reaction times are deleterious to obtaining high yields of the desired initiator. Thus, it is preferred that the reaction be terminated within 15 minutes. The prepared initiator should therefore preferably be utilized at the end of the reaction period while in solution by adding thereto the monomer desired to be polymerized. Isolation of the initiator is difficult, but storage of the resulting solution at low temperatures of $-40°$ to $-78°C$ should give a reasonably long shelf-life.

As has been indicated, the material, lithium p-lithiophenoxide will initiate polymerization of any material that undergoes anionic polymerization. Typical examples of such monomers are unsaturated, organic compounds such as styrene, butadiene, isoprene, and methylbutadiene. For the remainder of this discussion, butadiene, the most popular monomer used in, particularly, solid propellant binders, will be used to illustrate the principles of this invention. Thus, the initiation of the reaction will proceed in accord with Reaction 5 below 5. $LiOC_6H_4Li + CH_2=CH-CH=CH_2 \longrightarrow LiOC_6H_4-CH_2-CH=CH-CH_2-Li$ Reaction 5, the initiation step, above, is preferably carried out by directly adding the monomer to the prepared initiator solution. As indicated above, as the initiator preparation reaction period increases above 15 minutes, generally the amount or yield of initiator decreases. Thus, it is preferred to add the monomer to the prepared initiator at a time when the yield of initiator is the highest or near the highest point, for example, 15 minutes after the initiator preparation reaction has begun or in other words, about 15 minutes after the final addition of BuLi.

It is preferred that the solution of the initiator be at a temperature of at least 15°C and in a range of 15° to 25°C during the addition of the monomeric material. The temperature, however, can be high as 60°C. Particularly, it is preferred that the temperature be 20°–25°C at the time of addition because below this temperature polymerization is slow, and above 35°C, the initiator will undergo side-reactions.

The initiation Reaction 5 is followed by a propagation reaction indicated below wherein the functionally terminated linear polymeric material is formed.

6. $LiOC_6H_4-CH_2-CH=CH-CH_2-Li + nCH_2=CH-CH=CH_2 \rightarrow LiOC_6H_4-CH_2-(CH=CH-CH_2)_{n+1}Li$ The reaction is generally allowed to proceed until propagation is completed. This is noted by the disappearance of the butadiene monomer, which can be detected by odor or infrared analysis. Generally, the propagation reaction will transpire from 15 minutes to 60 minutes depending upon the temperature and/or the concentration of initiator. The mole ratio of the monomer to initiator governs the molecular weight of the resulting linear polymer. The relationship between initiator and amount of starting monomer is more fully explained below.

The resulting structure of Reaction 6, as can be seen, is a polymer terminated on one end with C-Li and the other end with -OLi. This functionally terminated polymer is referred to as a "living" polymer since no mechanism exists for self termination or chain transfer by which the active C-Li chain end can be destroyed or killed. Thus, even after long periods of storage such "living" polymers are capable of reacting with additional monomeric species, which are then incorporated into the structure to give products of higher molecular weight. These "living" polymers of the invention are novel materials which are useful in themselves, separate from the formation of star polymers where it is desired merely to have linear polymeric products. The polymers can be terminated in accordance with either of the following illustrative reactions utilizing $CO_2$ or $H_2O$.

7. $R(-CH_2-CH=CH-CH_2-)_{n+1}Li + CO_2 \rightarrow R(-CH_2-CH=CH-CH_2-)_{n+1}CO_2Li$ 8. $R(-CH_2-CH=CH-CH_2-)_{n+1}Li + H_2O \rightarrow R(-CH_2-CH=CH-CH_2-)_{n+1}H$ In addition to carbon dioxide, other agents, such as formaldehyde and ethylene oxide will yield polymers similar in structure to that shown in the resulting product Reaction 7, where COOLi is replaced by -CH₂OH and -CH₂-CH₂-OH respectively. Additionally, any active hydrogen containing material such as water, shown in Reaction 8, e.g., alcohols or primary or secondary amines, can kill the living polymers, and leave no functional group at the destroyed chain end. It is for this reason, and the high degree of reactivity of the C-Li group with atmospheric oxygen and carbon dioxide that all such polymerizations and subsequent reactions must be carried out under conditions which rigorously exclude any of these species. Therefore, completely inert atmospheres, such as dry nitrogen or argon are preferably utilized when polymerizing and handling the living polymeric material.

The molecular weights of linear polybutadienes produced with lithium P-lithiophenoxide as an initiator in accord with Reaction 6, were much higher than expected. In order to explain this it is pointed out that in anionic polymerization, $\overline{M}_n$ = grams of monomer/moles of initiator where $\overline{M}_n$ is the number-average molecular weight. The parameter for the initiator should preferably read effective moles of initiator. Any occurrence that results in a reduction in the concentration of initiator raises the molecular weight of the polymer. Regardless of the route by which this occurs, such as reaction with impurities, complex formation, lack of solubility in the medium and the like, the effective concentration of the initiator is lowered and the polymer molecular weight is increased. Additionally, if the initiation step is much slower than the propagation, all the initiator will not be utilized. Once again the effective moles of intiator will be less than the total moles of initiator.

It was found that the lithium p-lithiophenoxide was ineffective in initiating butadiene polymerization at 0°C. However, it is known that butyllithium will rapidly polymerize butadiene at this temperature. Thus, it is concluded that no butyllithium was present when butadiene was introduced to the initiator solution. When 30°C was utilized, reasonable rates of initiation were obtained. Nevertheless the efficiency still was not as high as described. At least 25 to 30 percent of the lithium p-lithiophenoxide prepared was recovered after the polymerization was completed.

The presence of unreacted lithium p-lithiophenoxide at the completion of polymerization was confirmed by quenching a portion of the reaction mixture after polymerization with dry ice to convert any lithium p-lithiophenoxide to the lithium salt of p-hydroxybenzoic acid. The amount of this acid found is a measure of the unreacted lithium p-lithiophenoxide.

It is believed that a major portion of the problem of the lithium p-lithiophenoxide efficiency resides in its low solubility in the solvent tetrahydrofurane. For example, during preparation, clouding occurs almost immediately after the last of the butyllithium is added. The cloudiness disappears during polymerization and is less marked when the initiator is prepared at higher temperatures or in more dilute solutions. The clouding appears to be insoluble initiator. It is believed that the insoluble fraction does not initiate polymerization. Thus, if one desires to avoid the presence of some insoluble initiator, it is evident that an extremely high dilution would be necessary. However, a limiting factor is the small quantity of polymer that can be prepared with low concentrations of initiator. Thus, an effort was directed to a means for increasing the solubility of the functional group terminated initiator, though it should be established that lithium p-lithiophenoxide is a successful initiator and does achieve the results set forth in the foregoing reactions. A more soluble initiator will produce the same polymer, but with better molecular weight control and in higher yields.

In order to provide an initiator having improved solubility as compared to the lithium p-lithiophenoxide, tetrabutylammonium p-lithiophenoxide by virtue of its higher organic content is more soluble in tetrahydrofurane than lithium p-lithiophenoxide. The tetrabutylammonium salt of p-bromophenol was prepared by reacting tetrabutylammonium hydroxide with p-bromophenol in accord with the following reaction:

9. 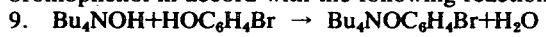 $Bu_4NOH + HOC_6H_4Br \rightarrow Bu_4NOC_6H_4Br + H_2O$

The salt was then reacted for 30 minutes with butyllithium in accord with the following reaction:

10. 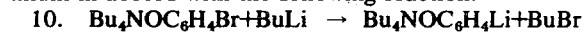 $Bu_4NOC_6H_4Br + BuLi \rightarrow Bu_4NOC_6H_4Li + BuBr$

After the 30 minutes, the material was quenched in dry ice in accord with the following reaction to provide a solid, melting over a range of 185° to 215°C which is believed to be hydroxy benzoic acid. This is seen in the following Reaction 11;

11. 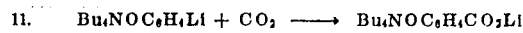 $Bu_4NOC_6H_4Li + CO_2 \longrightarrow Bu_4NOC_6H_4CO_2Li$

$HOC_6H_4COOH$

Utilizing the hydroxybenzoic acid, a determination was made as to the amount of the tetrabutylammonium p-lithiophenoxide obtained. This amount was found to be six times the yield of lithium p-lithiophenoxide. Since this reaction was carried out in tetrahydrofurane and the reaction solution was clear, it was determined that the solubility of the tetrabutylammonium p-lithiophenoxide was at least six times that the solubility of lithium lithiophenoxide.

The tetrabutylammonium p-lithiophenoxide would react with butadiene to provide the following structure which has the required C-Li terminal bond so that it will be a living polymer as previously described and capable of a star formation in the presence of a suitable coupling agent.

$Bu_4N-O-C_6H_4(CH_2-CH=CH-CH_2)_nLi$

The terminal $-ONBu_4$ can later be hydrolyzed to the free phenol if so desired.

The coupling step, which is the step that forms a star polymer, is a very critical one. Precise stoichiometry is necessary if a pure star polymer is to be obtained. The living polymer of Reaction 6 is reacted with a suitable coupling agent, which preferably is $SiCl_4$, where a four arm star is desired or $CH_3SiCl_3$ where a three arm star is desired. Other coupling agents can include, for example, $TiCl_4$, $C_6H_3(CH_2-Cl)_3$, $C_6H_2(CH_2Cl)_4$, and and like. The coupling reaction is as follows:

12. $4PLi + SiCl_4 \rightarrow P_4Si + 4LiCl$ where P=polymer. The coupling reaction between the lithium lithiophenoxide initiated polybutadiene and $SiCl_4$ represented by the following equation:

13. 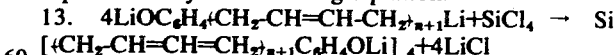 $4LiOC_6H_4(CH_2-CH=CH-CH_2)_{n+1}Li + SiCl_4 \rightarrow Si[(CH_2-CH=CH-CH_2)_{n+1}C_6H_4OLi]_4 + 4LiCl$ An excess of the coupling agent must be avoided if the star polymer is to be produced. For example, from above equation 12, it can be seen that only a two armed star will result if a two to one stoichiometry is used. Obviously, a 4:1 ratio must be employed if a four armed star is desired, as seen in Reaction 13. A three armed star will be formed in Reaction 13 where a 3:1 ratio is used. If $CH_3LiCL_3$ is used the product will be

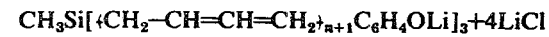

A slight excess of the living polymer, on the other hand, is not nearly so deleterious to the production of the star polymer. The method of coupling, in fact, involves preparing the star polymer by a dropwise addition of the coupling agent such as $SiCl_4$ to the solution of the living polymer until the color of the solution, which is normally yellow, is almost discharged. By this manner, a four armed star contaminated with a small quantity of linear polymer is obtained. The polymeric species are then readily separated.

It is pointed out that the possibility of a reaction at the phenoxy end of the polymer exists in accord with the following reaction:

14. $-C_6H_4OLi + SiCl_4 \rightarrow -C_6H_4-O-SiCl_3 + LiCl$

The above reaction 14 could lead ultimately to cross linking and gel formation. To minimize or eliminate this reaction, which is much slower than the desired one, the coupling step is carried out at a temperature of preferably 0°C. As indicated addition is carried out slowly so that any local excess of the coupling agent is avoided. It has been demonstrated that no gel is formed during coupling and that the coupling technique appears to produce a satisfactory star polymer.

A complication that can occur in the coupling step is related to the initiator. Any initiator still present after polymerization will react with the coupling agent such as $SiCl_4$ and produce hydroxyphenyl arms. Thus, where some of the lithium lithiophenoxide is not soluble and does not initiate a polymer chain, this material can tend to react with $SiCl_4$ and prevent the formation of four armed stars. For this reason it is further preferred to utilize as an initiator a fully soluble material, such as tetrabutylammonium p-lithiophenoxide.

In order for the star polymers to be particularly useful as binders for solid propellants it is desirable to provide fully saturated materials. This would require hydrogenation of the unsaturated star polymer to reduce the double bonds in the polymer structure as well as those in the terminal phenol group. A platinum on charcoal catalyst will reduce the double bonds in the polymer but does not affect terminal phenol groups. On the other hand, a Raney nickel catalyst should reduce the phenol group and thus provide an end-saturated star polymer having terminal functional groupings such as $C_6H_{10}OH$. It is believed that the invention will be further understood from the following detailed specific examples:

EXAMPLE 1

In a glass reaction vessel, 0.750 grams of p-bromophenol was dissolved in 700 milliliters of tetrahydrofurane which had first been distilled out of calcium hydride and then polystyryl lithium. Thirteen milliliters of butyllithium in hexane (1.56N) was then added to the solution which was at a temperature of 25°C. The addition required 6 minutes (in order to obtain good mixing and avoid local overconcentrations of butyllithium), during which time the temperature rose to 27°C. A cloudiness appeared after one minute which increased during a subsequent 30 minutes and did not disappear when the temperature was raised to 30°C. An initiation temperature of 30° was believed to favor initiation over propagation, a desirable phenomenon for controlling molecular weight. At this point there existed lithium p-lithiophenoxide in solution, formed in accord with Reaction 3 above. 4.5 milliliters or 2.8 grams of butadiene was then added to the solution. A lemon-yellow color appeared at once and the cloudiness began to disappear after 5 minutes. The reaction mixture was then cooled to 0°C in an ice bath and allowed to react for 70 minutes at which time a 100-ml sample was withdrawn utilizing a hypodermic syringe and injected into 250-ml of methanol. An immediate discharge of the lemon-yellow color was observed. Silicon tetrachloride in benzene (the solution containing 1.92 meg/ml) was added dropwise via a hypodermic syringe to the prepared solution over a 1 hour period at 0°C. A total of 0.65-ml of the silicon tetrachloride in benzene solution was required to discharge the color of the yellow polybutadienyl anion. One-ml of butyllithium was then added to destroy any SiCl species and the excess butyllithium destroyed with methanol.

EXAMPLE 2

The methol quenched polymer of Example 1 was worked up by evaporating it to dryness under nitrogen and then dissolving it in benzene. Extraction of the benzene layer with water for the purpose of removing lithium phenolates was followed by shaking the benzene layer with aqueous HCl. The benzene layer was then washed with water until it was acid-free and dried over $MgSO_4$. After decanting the polymer solution, it was stripped to dryness in an evaporator. The polymer was then placed in a vacuum oven at 40°C and pumped for at least 24 hours. The polymer molecular weight $M_n$ was determined in a Mechrolab Vapor Phase Osmometer, using ethylene dichloride as the solvent. The polymer had a molecular weight of 2020. Infrared analysis of the methanol quenched polymers made in accord with this example confirmed the indicated structure.

EXAMPLE 3

The work-up of the star polymer formed by the reaction with the silicon tetrachloride was accomplished by adding a ten percent solution of the star polymer in tetrahydrofurane to methanol. The bulk of the polymer was precipitated. The precipitated polymer was then triturated with methanol until no color was imparted to the methanol. During the trituration, some of the methanol fractions were acidified with HCl to convert the terminal phenoxide groups on the polymers to free phenolic groups. After trituration, the polymer was dried in a vacuum oven at 40°C and then characterized. The star polymer was found to have a molecular weight of $M_n=6610$, utilizing the osmometer. Further, an infrared spectrum of the polymer was obtained. The spectrum confirmed the existence of the star polymer and particularly the terminal functional groupings achieved. The degree of branching calculated for this polymer was 6610/2020 or 3.3.

EXAMPLE 4

To accomplish the hydrogenation of a star polymer, one gram of a polymer of $M_n=6450$ was dissolved in 50-ml of hexane in a hydrogenation bottle. One gram of palladium on charcoal containing 10 percent palladium was added to the solution and the bottle placed in a shaker. The bottom was then pressurized to 60 psi of $H_2$ at 25°C and shaken for 18 hours. A small sample was withdrawn and the catalyst removed. An infrared spectrum of the polymer showed the absence of any olefinic absorption bands and a strong phenyl absorption and band at $6.7\mu$. Hydrogenation was continued at an elevated temperature of 60°C and 60 psi. The phenyl group was unreacted even after several days of shaking. This indicated that the use of palladium on charcoal catalysts for hydrogenation reduced all the double bonds but did not reduce the terminal phenol groups.

I claim:

1. A method of linear polymerization which comprises the steps of:

reacting butyl lithium with a tetrabutylammonium salt selected from the group consisting of p-iodophenol and p-bromophenol in a solvent for said salt to form a solution of tetrabutylammonium p-lithiophenoxide initiator;

adding to said solution within a period not exceeding 30 minutes of said reaction an unsaturated, organic monomeric material capable of anionic polymerization by said initiator selected from the group consisting of butadiene, styrene, isoprene and methyl-butadiene; and reacting said monomeric material with said polymerization initiator to form said linear polymer.

2. The method of claim 1 wherein the polymerization is carried out at a temperature of at least 15°C.

3. The method of claim 1 wherein the polymerization is carried out at a temperature of 15° to 60°C.

4. The method of claim 1 wherein the amount of initiator is sufficient to provide a polymer with an LiO-terminal grouping.

5. The method of claim 1 wherein said monomeric material is butadiene.

6. The method according to claim 5 in which the solvent comprises tetrahydrofuran and the monomeric material is added to the initiator solution within 15 minutes of said reaction and the reaction is conducted at a temperature between 0°C and 30°C.

* * * * *